Feb. 23, 1926.
J. BARTHOLOWSKY
1,574,464
SCENERY FOR PICTURES AND METHOD OF PRODUCING SAME
Filed Nov. 6, 1922
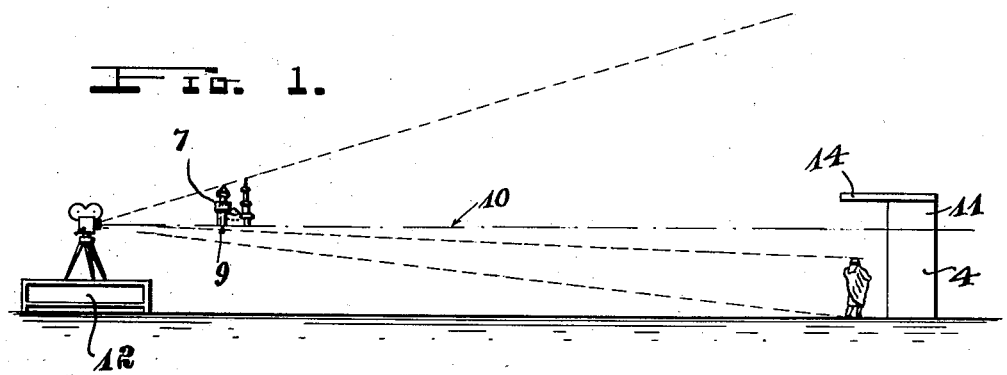
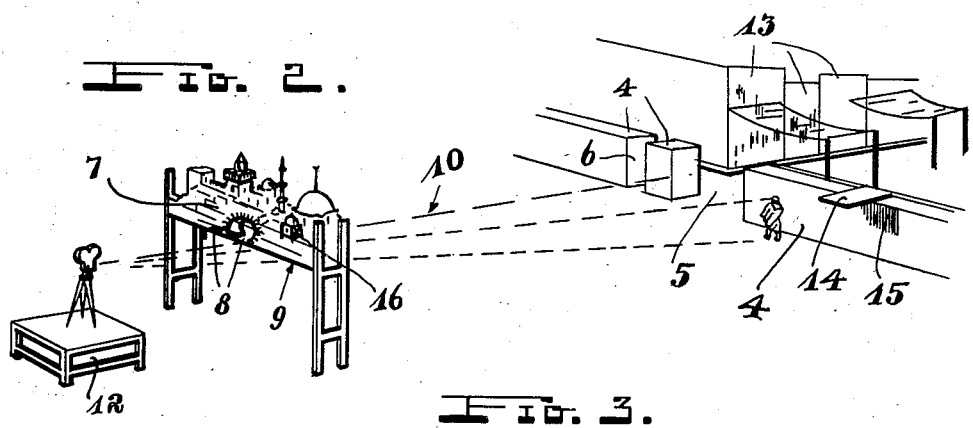
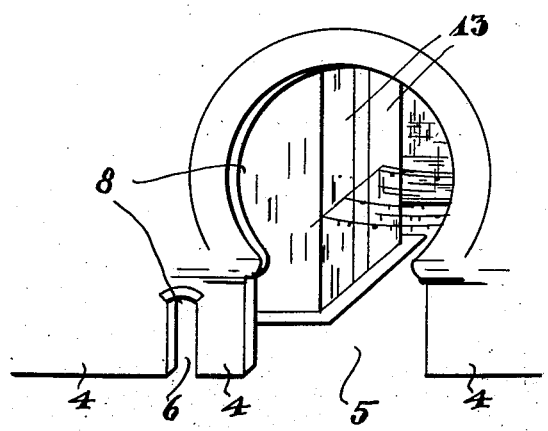
INVENTOR:
JOHANNES BARTHOLOWSKY,
BY: Otto H. Rueger,
his Atty.

Patented Feb. 23, 1926.

1,574,464

UNITED STATES PATENT OFFICE.

JOHANNES BARTHOLOWSKY, OF LOS ANGELES, CALIFORNIA.

SCENERY FOR PICTURES AND METHOD OF PRODUCING SAME.

Application filed November 6, 1922. Serial No. 599,313.

*To all whom it may concern:*

Be it known that I, JOHANNES BARTHOLOWSKY, a citizen of the Unitd States, residing at Los Angeles, in the county of Los Angeles and State of California, have invented new and useful Scenery for Pictures and Methods of Producing Same, of which the following is a specification.

This invention relates to matter used to reduce labor and expenses in producing scenery for pictures, and more particularly in producing scenery for motion pictures.

One of the objects of this invention is to provide the immediate surrounding, in which an action is to be photographed, of actual, real and full-sized scenery; while the further distant scenery is provided otherwise, not real.

Another object is to eliminate unnecessary structure, especially top structure, thereby eliminating all danger for the actors at the point of action, as in the reproduction of earthquakes, fires, explosions, and other cases where buildings or parts of structures are allowed or caused to crumple or collapse or fall.

Another object is to provide the more fanciful parts or portions of castles, temples, fairy-tale-buildings or sceneries and other similar articles or objects in a small and proportionally inexpensive model of some suitable plastic material, to display an image of the real thing to be photographed.

Another object is to reduce the expenses of producing motion pictures of non-local character.

Another object is to provide structure which appears in the picture as actually photographed at the point or place of action.

Another object is to assure natural lights and shadows in the actual portions as well as in the un-real parts of the finished pictures.

Another object is to provide structure by which any light may be equally well used on the real and unreal portions so as to produce an even and a proper shading on the finished picture.

Another object is to provide structure which does not require a photographing at a moment that convenient light may be obtainable at the point of action to correspond with shadings on the un-real portions, as commonly is the case when paintings and other similar flat reproductions are used in the un-real portions.

Another object is to provide structures by which the artistic effects of shadows or lights, as of clouds, sun- or moonshine, can be equally well reproduced on the real and unreal portions to assure a harmonious appearance of the combination in the finished picture.

Another object is to produce such structures of suitably perspective form in order to create the effect of distance with the smaller objects near the camera to correspond with the distance of action near the larger portions.

Other objects will appear from the following description and appended claims as well as from the accompanying drawing, in which—

Fig. 1 is a side elevation, illustrating a camera in position for photographing certain objects at a distance from the camera, displaying also other objects close to the camera.

Fig. 2 is a perspective illustration, in which the distant objects, being at the point of action, are of full-size and natural shape but only constructed up to slightly above the level of the lens of the camera; while the upper and more fanciful portions of such objects are reproduced and displayed in a smaller scale at a point nearer the camera.

Fig. 3 is a fragmentary detail perspective view of the gates, appearing in the central portion of the full-size structure at the point of action as well as in the smaller reproduction near the camera, illustrating that the full-size portions and structures in the background of the gates are preferably constructed up to a point above the first-mentioned level, so as to appear in the openings of the small reproductions, allowing also a transferring of action through the free opening.

In the production of motion pictures, it has become customary to construct scenery of large proportions. Many pictures deal with non-local, oriental, and often imaginary matter, of which it is difficult, expensive, and eventually impossible to reproduce a full-sized image. A reproduction of such matter in a small scale, however, is easily accomplished in the manner described hereafter.

The public, on the other hand, after having been supplied with gorgeous and costly pictures and demonstrations, has become rather exacting in its taste. It is, therefore, desirable not to limit the scenery in and of a motion picture to the narrow space of the real action, but rather to supply a perfect and complete distant scenery as well.

Surrounding the real point or place of action, objects can easily be built in actual size and shape. In Fig. 2, for instance, a wall 4 with the large gate 5 and the smaller gate 6 can easily be built in actual size; while the more fanciful top of the wall, and the upper portions of houses and towers visible in the background behind the wall, can easily be reproduced in a small scale, as indicated at 7. The upper and more fanciful portions of the gates are preferably also formed in the smaller structure, as indicated at 8.

The lower edge of the smaller structure, indicated at 9, is preferably in the level of the lens of the camera. Such a level may be called the horizon-line, being represented in Figs. 1 and 2 in the lines 10. The horizon-line is preferably some distance below the upper terminations of the full-sized structures so that the smaller structures overlap to a suitable extent to produce the proper effect in the complete picture, the upper portion 11 of the wall 4 in Fig. 1 being clearly illustrated above the horizon-line 10.

Placing a small or miniature reproduction close to the camera, however, does not in itself give the effect of commensurable proportions between such miniature reproduction and a more distant and full-size structure at the point or place of action. One important feature of this invention is therefore to produce the miniature structure in a suitably perspective manner. A small body, placed close to the camera, commonly appears in the finished picture distinctly as such, and an alert observer can easily detect or realize the close or near position of the small object, thereby spoiling the desired illusion of seeing a full-sized body or object at a greater distance, as at the point of action. However, in having the small body in a perspective form, such a perspective body, when placed close to the camera, appears in the finished picture as absolutely integral with a larger body placed at a greater and corresponding distance from the camera.

If certain moving objects are to perform in a picture, the camera is preferably mounted to bring the lens at a level above the heads or tops of the moving objects, a platform for such purpose being indicated at 12 in Figs. 1 and 2.

Houses or objects directly behind the wall 4, as the houses 13 in Figs. 2 and 3, are preferably constructed to appear through the gates 8, 5 and 6, especially through the openings or spaces not covered by the miniature structure. A festival procession, or any other action, desired to perform in a continuous manner through the gates, would be cut off if such higher structures were embodied in the miniature structure. Such procession or action can easily be photographed through the free gates, as will easily be understood from the illustration in Fig. 3.

All ground spaces, streets, structures, and buildings are therefore preferably formed and arranged in natural size and at the proper distance from the camera, as far as the lower portions below the horizon-line are concerned; while all higher points and objects and more distant objects are preferably reproduced in a perspective miniature, for the reasons disclosed herewith.

Outbuildings, eventually throwing shadows over the lower portions, when largely embodied in the miniature structures, are preferably represented in the full-size structures to such an extent as to produce the shadows directly on the lower full-size portions of the structures, instead of depending on obtaining such shadows through corresponding parts from the miniature structures. In Fig. 2, for instance, boards 14 are provided to produce a shadow 15 on the wall 4, of an appearance as if produced by the balcony 16 of the miniature structure. The finished picture, in this manner, shows combinations which perfect and complete the illusion of being photographed from a single complete scenery at the actual point of action.

The miniature, of course, is reproduced as perfect as possible, and preferably painted in true colors, with a tint of lighter or stronger blue to produce the necessary atmosphere of distance, as it is well known that blue serves to produce proper effects and results. By the use of such bluish tint, the miniature, which is only a few feet away from the camera, can be made to appear at at a greater distance, tending to complete the illusion of natural appearance.

Flat paintings and other similar means now in use are as a matter of fact not very practical and to a great extent even useless for stereopticon purposes and color filming. Perspective reproductions, however, are very useful, and appear very natural in connection with stereoptic and color filming.

Having thus described my invention, I claim:

1. In producing pictures, the method of providing full-size objects in the surrounding of moving objects up to a level above the moving objects, providing miniature objects in the foreground of the moving objects above the first-mentioned level and so as to unite into one scenery when photographed together, and photographing the said objects together with an actual performance.

2. In producing pictures, the method of providing full-size objects in the immediate surrounding of moving objects of which a picture is to be produced up to a level above the moving objects, providing a miniature reproduction to represent continuations of the first-named objects above the first-mentioned level and of more distant objects to form an integral scenery with the first-named objects in the finished picture, and photographing the said objects together with an actual performance.

3. In producing pictures, the method of providing full-size objects in the immediate surrounding of moving objects of which a picture is to be produced extending up to a level above the moving objects, providing a miniature reproduction to represent continuations of the first-named objects above the first-mentioned level including more distant objects, the miniature being disposed closer to the camera in the foreground of the moving objects and being made in a perspective form adapted to produce the effect of distance and the illusion of a single integral scene in the finished picture, and photographing the said objects together with an actual performance.

4. In producing pictures, the method of providing buildings and structures in the immediate surrounding of actors only up to a point and level slightly above the heads of the actors for eliminating danger for the actors in scenes of reproductions of dangerous and hazardous incidents, providing the upper portions of such buildings and structures in miniature form disposed closer to the camera in the foreground of the positions of the actors so that the destruction of the upper portions of the buildings and structures and the falling of parts from such upper portions cannot endanger the actors, and photographing the said objects together with an actual performance.

5. In producing pictures, the method of providing buildings and structures in the immediate surrounding of actors only up to a point and level slightly above the heads of the actors for eliminating danger for the actors in scenes reproducing dangerous and hazardous incidents, providing the upper portions of such buildings and structures in miniature form in a perspective manner in apparent natural positions disposed in the foreground of the positions of the actors so that the destruction of the upper portions of the buildings and structures and the falling of parts from such upper portions cannot endanger the actors adapted to produce the effect of distance and the illusion of a single integral scene in the finished picture by reason of the perspective form, and photographing the said objects together with an actual performance.

6. In a scenery for pictures, full-size objects at points of a performance extending upwardly to a level above the heads of actors, and miniature objects disposed near the camera to a scale commensurate with the scale of the full-size objects in relation to the different positions of the objects to appear as supplementing one another in a finished picture.

7. In producing pictures, the method of establishing a focus level, providing all objects below such level of full size at the point of performance, providing all objects above such level of miniature size at a point near the camera, and photographing a performance with said objects to appear as a whole in a finished picture.

8. In producing pictures, the method of establishing a focus level, providing all objects at the point of performance of full size, enacting a performance near such objects, providing other objects of miniature size near the camera to extend downwardly to the focus level so as to overlap the other objects at the focus level, and photographing the whole with the performance.

9. In producing pictures, the method of establishing a certain dividing and focus level to be in alignment with the center of the lens of a camera, placing a camera with its lens disposed in the level so established, placing miniature objects in apparent natural positions in relation to one another close to the camera and made to a scale commensurate with the scale of objects of a scene at a larger distance from the camera when photographed together, the miniature objects being arranged above said level while the objects of the scene to be photographed are maintained below the said level, and photographing the objects so arranged.

10. In producing pictures, the method of establishing a certain dividing and focus level, placing a camera with its lens disposed in the level so established, arranging an actual scene and performance below said level, arranging supplementary miniature scenes above said level, and photographing the whole.

In testimony that I claim the foregoing as my invention I have signed my name.

JOHANNES BARTHOLOWSKY.